United States Patent [19]

Haak

[11] Patent Number: 4,994,953

[45] Date of Patent: Feb. 19, 1991

[54] DC POWER SUPPLY FOR HIGH POWER APPLICATIONS

[75] Inventor: David A. Haak, Rockford, Ill.

[73] Assignee: Sundstrand Corporation, Rockford, Ill.

[21] Appl. No.: 393,717

[22] Filed: Aug. 15, 1989

[51] Int. Cl.$^5$ .................. H02M 3/00; H02M 7/10
[52] U.S. Cl. .................... 363/71; 363/60; 318/811; 307/82; 307/87
[58] Field of Search ............... 363/45, 46, 67, 68, 363/69, 70, 71, 72, 39, 59, 60, 61; 318/807, 809, 811; 307/18, 19, 20, 58, 82, 87, 105

[56] References Cited

U.S. PATENT DOCUMENTS

| | | | |
|---|---|---|---|
| 3,792,286 | 2/1974 | Meier | 363/71 X |
| 3,970,914 | 7/1976 | Salzmann et al. | 363/45 |
| 3,979,662 | 9/1976 | Klein | 363/71 |
| 4,122,515 | 10/1978 | Tachibana et al. | 363/45 |
| 4,204,264 | 5/1980 | Lipman | 363/71 |
| 4,366,532 | 12/1982 | Rosa et al. | 363/45 X |
| 4,498,127 | 2/1985 | Fiorina | 363/5 |
| 4,509,108 | 4/1985 | Gallios | 363/45 |
| 4,587,604 | 5/1986 | Nerone | 363/17 |
| 4,663,702 | 5/1987 | Tanaka | 363/65 |
| 4,695,933 | 9/1987 | Nguyen et al. | 363/71 X |
| 4,843,534 | 6/1989 | Taddeo et al. | 363/71 |

Primary Examiner—Steven L. Stephen
Assistant Examiner—Emanuel Todd Voeltz
Attorney, Agent, or Firm—Antonelli, Terry, Stout & Kraus

[57] ABSTRACT

A DC power supply (10) in accordance with the invention includes a plurality of DC to DC converters (20), each converter converting a multiple phase AC potential to a DC output potential (24) containing an undesired AC component; a circuit (30) for combining the DC output potential of each converter into a combined DC output potential (16) and arithmetically cancelling the undesired AC component; and a controller (22) for producing a time reference (A, B, ... N) applied to each of the converters to set an angular relationship of each of the phases of each converter with respect to the applied time reference, the time reference of each of the converters being spaced apart from a time reference of another of the converters by an angle $\theta$ wherein $$\theta = \frac{360°}{6n}$$

wherein n is equal to $2^x$ where x is an integer and n is the number of converters.

24 Claims, 2 Drawing Sheets

DC POWER SUPPLY FOR HIGH POWER APPLICATIONS

DESCRIPTION

1. Technical Field

The present invention relates to DC power supplies for driving high power loads at high potentials.

2. Background Art

AC to DC converters are known in which two phase separated voltages are rectified and combined into a common output with the respective phase angles of the two voltages being displaced by 30° to cancel harmonics without the use of filters. See U.S. Pat. No. 4,498,127. The '127 patent discloses a static converter which maintains a precise phase relationship for driving two three phase full wave rectifiers respectively with a phase shift of 30° between the AC inputs to the rectifier bridges. The 30° phase shift is produced by a transformer which is coupled between a single three phase AC input and one of the two full wave rectifier bridges. The other of the full wave rectifier bridges is connected directly to the input three phase voltage source. The system of the '127 patent is limited in that it is only applicable to a system utilizing two rectifier bridges. This is disadvantageous for high power applications in which it is necessary to produce a high voltage high power DC output by utilizing more than two full wave rectifier bridges.

It is also known to filter harmonics from a DC output potential produced by a full wave rectification bridge by use of inductors and capacitors. However, for high power high voltage applications, the size and weight of the inductors and capacitors can be substantial. Size and weight of filter components is of extreme importance for applications such as air frames or space stations where size interferes with the efficient utilization of the air frame or space station and weight interferes with the overall efficiency of maintaining the air frame in flight or placing the space station into orbit.

Furthermore, the coupling of multiple DC power sources in parallel to produce a high voltage high power output in which each source has its output filtered by a filter containing inductors and capacitors has the same disadvantages noted above with regard to a DC power supply having a single DC power source.

DISCLOSURE OF THE INVENTION

The present invention provides a DC power supply for use in driving loads such as a laser which require high potential and high power. With the invention a plurality of DC to DC converters each produce multiple phase AC output current in which the phase of the AC output current is controlled by a time reference produced by a master controller which causes the respective phases of the DC to DC converters to have an angular relationship with respect to the applied time reference with the time reference of each of the converters being spaced apart from an adjacent time reference of another of the converters by an angle $\theta$ wherein $$\theta = \frac{360°}{6n}$$

wherein n is equal to $2^x$ where x is an integer and n is the number of converters. Combining of DC output potentials produced by the plurality of DC to DC converters causes phase cancellation of undesired ripple components produced by rectification of the AC phases of the plurality DC to DC converters. Elimination of unwanted ripple components is produced without LC filters which have the weight and size penalty discussed above with reference to the prior art. Furthermore, the output potentials of the respective DC to DC converters are regulated by a voltage regulator to vary the output potential of the individual DC to DC converters to maintain a regulated combined DC output potential. Each DC to DC converter is preferably comprised of a multiple phase DC to AC inverter which drives a multiple phase voltage multiplier to produce a high voltage high power output. The high voltage high power output of each DC to DC converter is combined to produce the combined DC output potential.

A DC power supply in accordance with the invention includes a plurality of DC to DC converters, each converter converting a multiple phase AC potential to a DC output potential containing an undesired AC component; an output circuit for combining the DC output potentials of each converter into a combined DC output and arithmetically cancelling the undesired AC components; and a controller for producing a time reference applied to each of the converters to set an angular relationship of each of the phases of each converter with respect to the applied time reference, the time reference of each of the converters being spaced apart from an adjacent time reference of another of the converters by an angle $\theta$ wherein $$\theta = \frac{360°}{6n}$$

wherein n is equal to $2^x$ where x is an integer and n is the number of converters. In one embodiment of the invention the number of converters is equal to four. The undesired AC component contains at least a component having a frequency of 6f where f is a fundamental AC frequency of the converters. Preferably, the converters are three phase converters.

In a preferred embodiment of the invention, each DC to DC converter comprises a DC to AC inverter for converting a DC input into a multiple phase output with each phase of an AC inverter being phase displaced with respect to a corresponding phase of another inverter by an the angle $\theta$, the time reference controlling on/off switching points of switches contained within the inverters; a plurality of multiple phase multipliers, a different multiplier being coupled to the multiple phase outputs of each DC to AC inverter for producing a DC multiplier output potential greater in magnitude than the magnitude of the multiple phase potential which is an input to the multiplier; and an output circuit for combining the DC multiplier output potentials of the multiple phase voltage multipliers into the DC output potential.

Each DC to DC converter is coupled to a DC bus; and the output circuit comprises a plurality of inductors with each inductor being electrically coupled between an associated DC output producing the DC output potential of each DC to DC converter and a common junction point at which the combined DC output potential is produced.

The invention further includes a regulator, coupled to the DC output potential of each of the DC converters, for regulating the DC output potential of each converter to maintain the DC output potential constant by varying the time reference applied to each of the converters. A duty cycle of the time reference applied to each converter is varied inversely proportional to variation of the DC output potential of the converter from a set potential. The regulator may be coupled to the DC multiplier output potential of each of the DC voltage multipliers for regulating the DC output potential of each voltage multiplier to maintain the DC output potential constant by varying the time reference applied to each associated inverter.

BEST MODE FOR CARRYING OUT THE INVENTION

Figure 1:
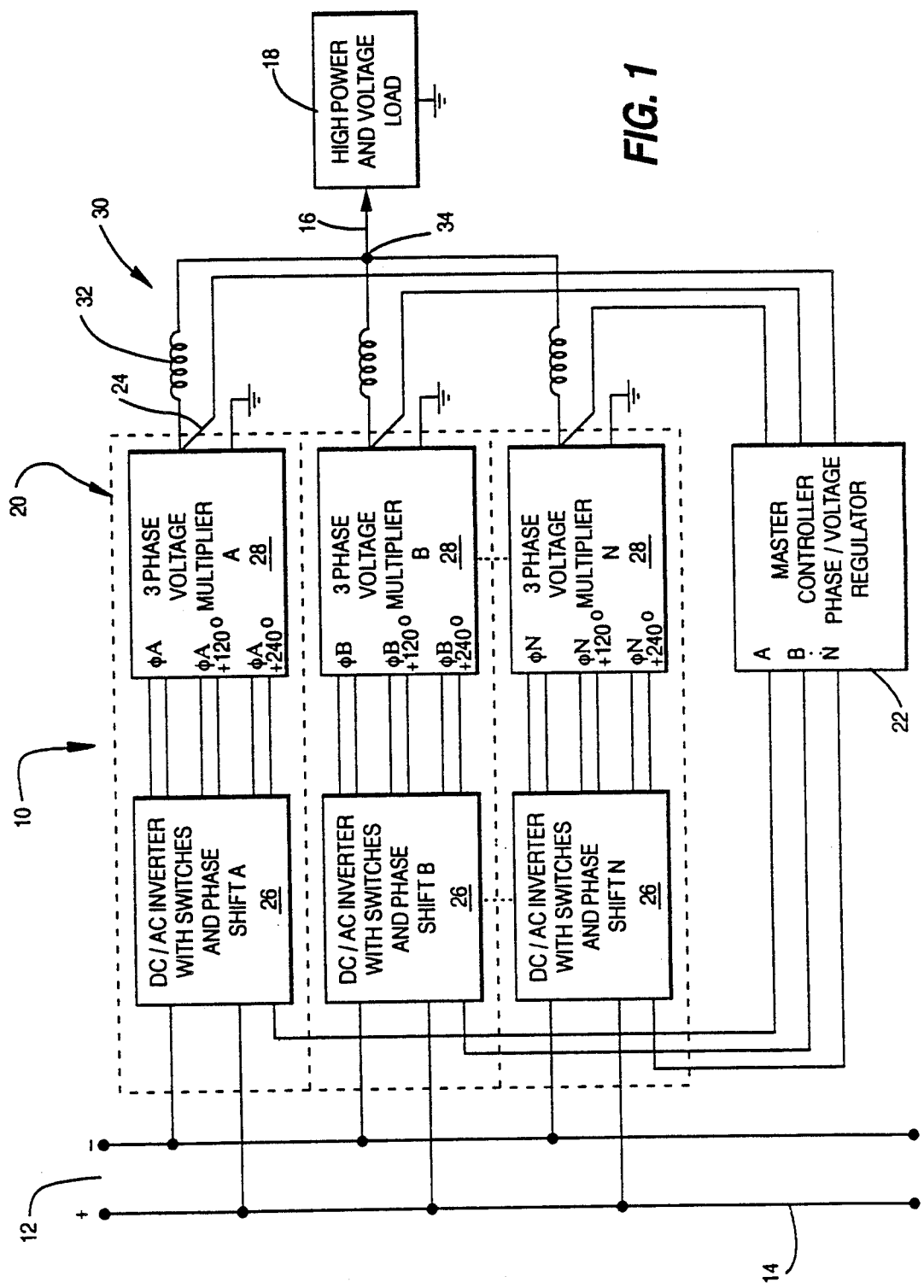
FIG. 1 illustrates a block diagram of a DC power supply in accordance with the present invention.

FIG. 1 illustrates a block diagram of a DC power supply 10 in accordance with the present invention. The present invention converts a DC input potential 12 which is applied by a DC bus 14 into a high voltage high power output DC potential 16 which has very low ripple current. The high power high potential output 16 containing very low ripple current drives a high power and high voltage load 18. The high power and high voltage load 18 may be a load contained in an air frame or a load such as laser to be utilized in a space craft. The high voltage high power output potential 16 is produced by operating a plurality of DC to DC converters 20 in parallel under the control of a master controller 22 which provides control signals to each of the DC to DC converters as described below and which regulates the output potential 24 produced by each of the DC to DC converters by monitoring the output potential and controlling a duty cycle of a time reference applied to each converter in a manner which is inversely proportional to the variation of the DC output potential of the converter from a set potential which is the desired point of regulation. Each DC to DC converter 20 is comprised of a conventional DC to AC inverter 26. Each inverter 26 is comprised of a plurality of switches (not shown) which are controlled by switching signals applied to control electrodes of the switches in a conventional fashion to produce a plurality of phase outputs which in a preferred embodiment are equal to three which each phase being displaced by 120° from adjacent phases. The design of the individual DC to AC inverters 26 is not part of the present invention and may be in accordance with any known design including switches which may be bipolar transistors or other high power semiconductor elements. Furthermore, without limitation, the inverters 26 may be resonant inverters.

The master controller 22 produces a plurality of output signals A, B..N which are equal in number to the number of individual inverters 26 in the system. The number of inverters 26 are chosen to produce the required output power in the high voltage high power output potential 16.

The present invention is predicated upon precisely controlling the time reference signals A, B,...N such that the angle $\theta$ separating adjacent time reference signals A, B,...and N equals $$\theta = \frac{360°}{6n}$$

wherein n is equal to $2^x$ where x is an integer and n is the number of converters to arithmetically cancel undesired AC components in the combined output as explained below. The frequency of the signals A, B...N is equal to N times the number of signal levels utilized by the individual inverters 26 which in the preferred embodiment is equal to 6f where f is the fundamental frequency of the AC current in the output of each of the phases of the inverters. When the signal frequency is 6f each inverter 26 produces three square waves which are separated by 120°. The outputs A, B...and N of the master controller 22 vary between two levels to define a squarewave. Each of the inverters 26 contains at least six switches with pairs of switches being alternately turned on and off to produce the output phases in a conventional manner. The time reference of each of the signals A, B...and N controls the three switch pairs contained in each inverter 26 which alternately connect the positive and negative potentials of the input potential 12 to the output potential to produce a squarewave varying at the fundamental frequency. This switching also produces undesired harmonics which the present invention arithmetically cancels by maintaining the foregoing phase relationship between the time reference signals A,B...N. A vectorial analysis of the harmonics produced by switching of the inverter 26 reveals that each component which is to be canceled has a counterpart 180° out of phase with it which results in the aforementioned arithmetic cancellation.

Each of the phase outputs produced by the inverters 26 is applied to an associated three phase multiplier 28. Each of the three phase multipliers 28 functions to step-up the magnitude of the AC input potential. The levels of each inverter 26 may be pulse width modulated to provide voltage regulation with the width of each level of the inverter being proportional to the difference between the output potential of each associated multiplier 28 and the desired output potential.

A DC output potential 24 produced by each of the three phase voltage multipliers 28, which are of identical construction, is combined by a combining circuit 30. The combining 30° circuit is comprised of a plurality of inductors 32 with a different inductor being connected between the output of each three phase voltage multiplier 28 and a junction point 34 at which the high voltage high power output potential 16 is produced. As a consequence of the master controller 22 producing the time reference signals A, B...N, the undesired AC components above the fundamental frequency cancel each other as described above from the high voltage high output potential 16 which eliminates the requirement for a heavy weight LC filter as used in the prior art which has the advantages noted above with regard to airframe and spacecraft applications.

Figure 2:
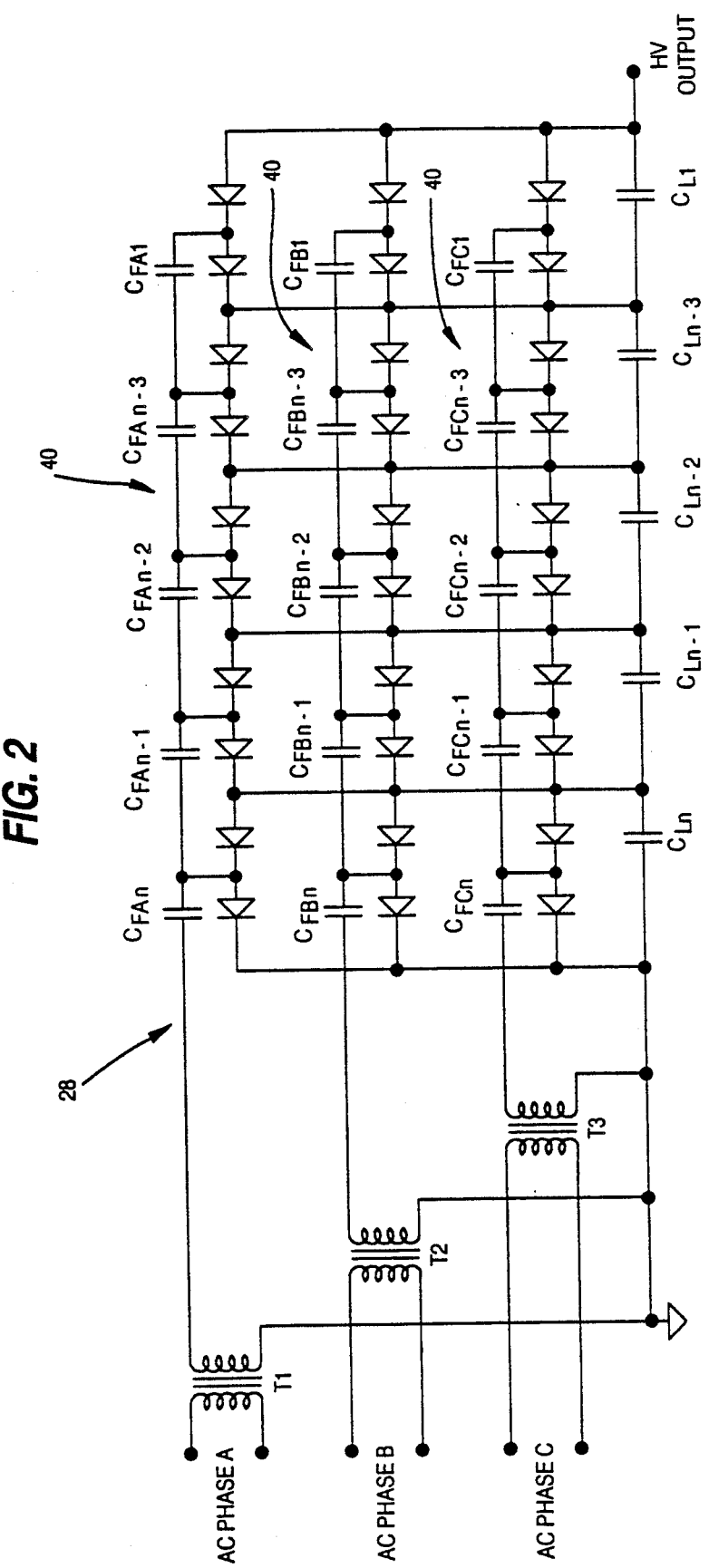
FIG. 2 illustrates a three phase voltage multiplier which may be used with the DC power supply of FIG. 1.

FIG. 2 illustrates a suitable embodiment of a three phase voltage multiplier 28 which may be utilized for implementing each of the three phase voltage multipliers. The voltage multiplier 28 contains a variable number of capacitor stages 40 with the number of stages being equal to n. A plurality of diodes are associated with each capacitor stage 40 to produce a voltage output which is higher in potential than the magnitude of the AC voltage inputted to the voltage multiplier in a conventional fashion. It should further be understood that other implementations of a voltage multiplier may be used in practicing the present invention with the voltage multiplier 28 of FIG. 2 being only exemplary.

While the invention has been described in terms of its preferred embodiment, it should be understood that numerous modifications may be made thereto without differing from the spirit and scope of the invention as defined in the appended claims. It is intended that all such modifications fall within the scope of the appended claims.

I claim:

1. A DC power supply comprising:
   a plurality of DC to DC converters, each converter converting a multiple phase AC potential to a DC output potential containing an undesired AC component, each DC to DC converter comprising a DC to AC inverter for converting a DC input into a multiple phase output with each phase of an inverter being phase displaced with respect to a phase of another inverter by the angle $\theta$, the time reference controlling on-off switching points of inverter switches contained within the inverter;
   means for combining the DC output potential of each converter into a combined DC output potential and arithmetically cancelling the undesired AC component;
   a controller for producing a time reference applied to each of the converters to set an angular relationship of each of the phases of each converter with respect to the applied time reference, the time reference of each of the converters being spaced apart from a time reference of another of the converters by an angle $$\theta = \frac{360°}{6n}$$

wherein n is equal to $2^x$ where x is an integer and n is the number of converters;
   a plurality of multiple phase voltage multipliers, a different multiplier being coupled to the multiple phase output of each inverter for producing a combined DC multiplier output potential greater in magnitude than the magnitude of the multiple phase input to the multiplier; and wherein
   the means for combining combines the DC multiplier output potentials of the multiple phase voltage multipliers into the combined DC output potential.

2. A DC power supply in accordance with claim 1 wherein:
   n is at least equal 4.

3. A DC power supply in accordance with claim 1 wherein:
   the undesired AC component contains at least a component having frequency of 6f wherein f is a fundamental frequency of the converters.

4. A DC power supply in accordance with claim 1 wherein:
   the converters are each 3 phase converters.

5. A DC power supply comprising:
   a plurality of DC to DC converters, each converter converting a multiple phase AC potential to a DC output potential containing an undesired AC component;
   means for combining the DC output potential of each converter into a combined DC output potential and arithmetically cancelling the undesired AC component;
   a controller for producing a time reference applied to each of the converters to set an angular relationship of each of the phases of each converter with respect to the applied time reference, the time reference of each of the converters being spaced apart from a time reference of another of the converters by an angle $$\theta = \frac{360°}{6n}$$

wherein n is equal to $2^x$ where x is an integer and n is the number of converters; and wherein
   each DC to DC converter is coupled to a DC bus; and
   the means for combining comprises a plurality of inductors with each inductor being electrically coupled between an associated DC output producing the DC output potential of each DC to DC converter and a common junction point at which the combined DC output potential is produced.

6. A DC power supply in accordance with claim 5 wherein:
   n is at least equal to 4.

7. A DC power supply in accordance with clam 5 wherein:
   the undesired AC component contains at least a component having a frequency of 6f wherein f is a fundamental frequency of the converters.

8. A DC power supply in accordance with claim 5 wherein:
   the converters are each 3 phase converters.

9. A DC power supply in accordance with claim 5 further comprising:
   each DC to DC converter comprises a DC to AC inverter for converting a DC input into a multiple phase output with each phase of an inverter being phase displaced with respect to a phase of another inverter by the angle $\theta$, the time reference controlling on-off switching points of inverter switches contained within the inverter;
   a plurality of multiple phase voltage multipliers, a different multiplier being coupled to the multiple phase output of each inverter for producing a DC multiplier output potential greater in magnitude than the magnitude of the multiple phase input to the multiplier; and
   the means for combining combines the DC multiplier output potentials of the multiple phase voltage multipliers into the combined DC output potential.

10. A DC power supply in accordance with claim 6 further comprising:
    each DC to DC converter comprises a DC to AC inverter for converting a DC input into a multiple phase output with each phase of an inverter being phase displaced with respect to a phase of another inverter by the angle $\theta$, the time reference controlling on-off switching points of inverter switches contained within the inverter;
    a plurality of multiple phase voltage multipliers, a different multiplier being coupled to the multiple phase output of each inverter for producing a DC multiplier output potential greater in magnitude than the magnitude of the multiple phase input to the multiplier; and
    the means for combining combines the DC multiplier output potentials of the multiple phase voltage multipliers into the combined DC output potential.

11. A DC power supply in accordance with claim 7 further comprising:
  each DC to DC converter comprises a DC to AC inverter for converting a DC input into a multiple phase output with each phase of an inverter being phase displaced with respect to a phase of another inverter by the angle $\theta$, the time reference controlling on-off switching points of inverter switches contained within the inverter;
  a plurality of multiple phase voltage multipliers, a different multiplier being coupled to the multiple phase output of each inverter for producing a DC multiplier output potential greater in magnitude than the magnitude of the multiple phase input to the multiplier; and
  the means for combining combines the DC multiplier output potentials of the multiple phase voltage multipliers into the combined DC output potential.

12. A DC power supply in accordance with claim 8 further comprising:
  each DC to DC converter comprises a DC to AC inverter for converting a DC input into a multiple phase output with each phase of an inverter being phase displaced with respect to a phase of another inverter by the angle $\theta$, the time reference controlling on-off switching points of inverter switches contained within the inverter;
  a plurality of multiple phase voltage multipliers, a different multiplier being coupled to the multiple phase output of each inverter for producing a DC multiplier output potential greater in magnitude than the magnitude of the multiple phase input to the multiplier; and
  the means for combining combines to DC multiplier output potentials of the multiple phase voltage multipliers into the combined DC output potential.

13. A DC power supply in accordance with claim 9 wherein:
  each DC to AC converter is coupled to DC bus; and
  the means for combining comprises a plurality of inductors with each inductor being electrically coupled between an associated DC output producing the DC output potential of each DC to DC converter and a common junction point at which the combined DC output potential is produced.

14. A DC power supply in accordance with claim 10 wherein:
  each DC to AC converter is coupled to a DC bus; and
  the means for combining comprises a plurality of inductors with each inductor being electrically coupled between an associated DC output producing the DC output potential of each DC to DC converter and a common junction point at which the combined DC output potential is produced.

15. A DC power supply in accordance with claim 11 wherein:
  each DC to AC converter is coupled to a DC bus; and
  the means for combining comprises a plurality of inductors with each inductor being electrically coupled between an associated DC output producing the DC output potential of each DC to DC converter and a common junction point at which the combined DC output potential is produced.

16. A DC power supply in accordance with claim 12 wherein:
  each DC to AC converter is coupled to a DC bus; and
  the means for combining comprises a plurality of inductors with each inductor being electrically coupled between an associated DC output producing the DC output potential of each DC to DC converter and a common junction point at which the combined DC output potential is produced.

17. A DC power supply comprising:
  a plurality of DC to DC converters, each converter converting a multiple phase AC potential to a DC output potential containing an undesired AC component;
  means for combining the DC output potential of each converter into a combined DC output potential and arithmetically cancelling the undesired AC component;
  a controller for producing a time reference applied to each of the converters to set an angular relationship of each of the phases of each converter with respect to the applied time reference, the time reference of each of the converters being spaced apart from a time reference of another of the converters by an angle $$\theta = \frac{360°}{6n}$$

wherein n is equal to $2^x$ where x is an integer and n is the number of converters; and
  means, coupled to the DC output potential of each of the DC converters, for regulating the DC output potential of each converter to maintain the DC output potential constant.

18. A DC power supply in accordance with claim 17 wherein:
  a duty cycle of the time reference applied to each converter is varied inversely proportional to variation of the DC output potential of the converter from a set potential to regulate the output potential.

19. A DC power supply in accordance with claim 17 wherein:
  n is at least equal to 4.

20. A DC power supply in accordance with claim 17 wherein:
  the undesired AC component contains at least a component having frequency of 6f wherein f is a fundamental frequency of the converters.

21. A DC power supply in accordance with claim 17 further comprising:
  each DC to DC converter comprises a DC to AC inverter for converting a DC input into a multiple phase output with each phase of an inverter being phase displaced with respect to a phase of another inverter by the angle $\theta$, the time reference controlling on-off switching points of inverter switches contained within the inverter.

22. A DC power supply in accordance with claim 21 wherein:
  the time reference is equal to n times a number of signal levels utilized by each inverter.

23. A DC power supply in accordance with claim 21 wherein:
  each DC to AC converter is coupled to a DC bus; and further comprising;
  a plurality of inductors with each inductor being electrically coupled between an associated DC output producing the DC output potential of each DC to DC converter and a common junction point at which the combined DC output potential is produced.

24. A DC power supply in accordance with claim 22 wherein:
   each DC to AC converter is coupled to a DC bus; and further comprising:
   a plurality of inductors with each inductor being electrically coupled between an associated DC output producing the DC output potential of each DC to DC converter and a common junction point at which the combined DC output potential is produced.

* * * * *